Patented Jan. 26, 1932

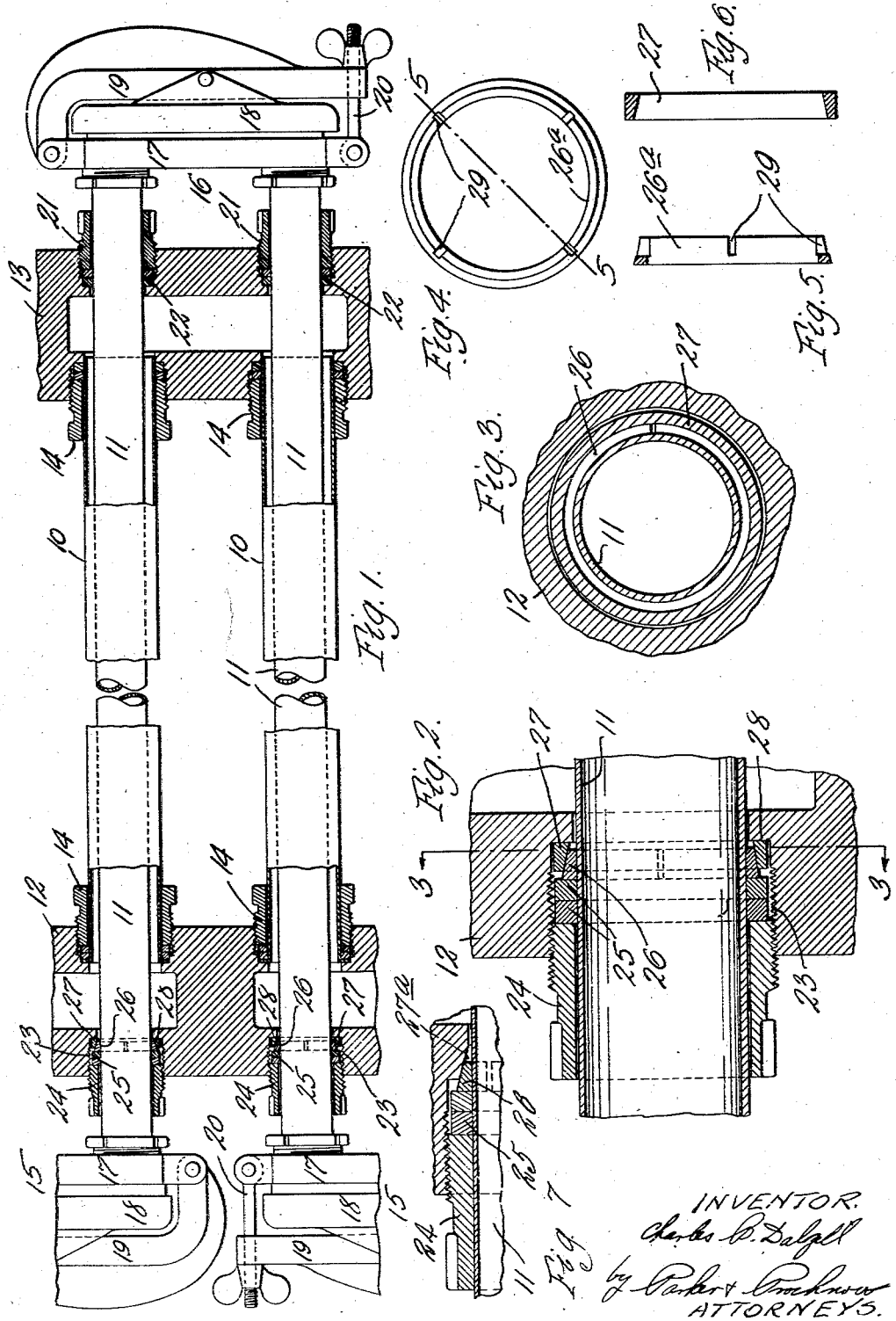

1,842,389

UNITED STATES PATENT OFFICE

CHARLES B. DALZELL, OF LITTLE FALLS, NEW YORK, ASSIGNOR TO CHERRY-BURRELL CORPORATION, OF WILMINGTON, DELAWARE, A CORPORATION OF DELAWARE

HEAT EXCHANGE DEVICE

Application filed February 14, 1931. Serial No. 515,748.

This invention relates to improvements in heat exchange apparatus, and more particularly to heat exchange apparatus of that type comprising inner and outer tubes arranged one within the other so that a fluid such, for instance, as milk flowing through the inner tubes is adapted to be cooled or heated by water or other suitable medium flowing through the outer tubes in contact with the inner tubes.

The tubes in such apparatus are subject to unequal expansion and contraction, due to the difference in temperatures of the fluids or media flowing through the different tubes or contacting with different parts of the apparatus, and one of the difficult problems in connection with such apparatus has been to prevent the endwise creeping of the tubes resulting from the expansion and contraction thereof. In the case of internal tube milk coolers or heaters, there is not only the difference in temperatures between the milk and water or other temperature-changing medium employed, to contend with, but it is imperative to keep the apparatus in a thoroughly sanitary condition, for which purpose the apparatus is generally sterilized after each run of the milk therethrough by turning live steam into the milk tubes. This causes them to expand much more rapidly than the outer tubes. The ends of the inner tubes extend out through the headers or return connections which join the outer tubes, one to another, and the relatively greater expansion and contraction of the inner tubes causes a movement thereof in the packing boxes through which their ends extend, and unless means are provided to prevent it, the tubes will become displaced or disarranged axially and throw the end connectors for the inner tubes out of line, often resulting in leakage.

In a well-known construction employed for this purpose, a small collar or ring is fixed to each inner tube near one end, and is locked in the packing box through which this end of the tube passes by means of the packing box gland or nut. It has been found in practice, however, to be a difficult problem to properly secure or fasten these locking or locating collars to the inner tubes. This has been most successfully done by providing the inner tubes with shallow external grooves and forcing the collars into these grooves and then sweating them on with solder, but even with this precaution the collars will break loose and enable the tubes to crawl endwise with the consequent displacement of the tubes and leakage mentioned.

One object of this invention is to produce a tubular heat exchange apparatus of simple and practical construction which obviates the difficulties and objections mentioned.

Other objects of the invention are to produce a heat exchange apparatus of the internal tube type with efficient means of simple construction for locking or locating the internal tubes in place and preventing endwise displacement thereof; also to provide a construction for the purpose mentioned which will lock the inner tubes in place at one end and permit the free expansion and contraction thereof; also to provide a construction for the purpose mentioned which will lock the inner tubes in place at one end and permit the free expansion and contraction thereof through the glands or packing boxes at the opposite ends of the tubes; also to provide locking or locating means for the inner tubes which permit the ready assembling and removal of the tubes; also to provide a construction which does not necessitate the grooving of the tubes for fastening the collars thereon, thus enabling the use of thinner tubes, which not only reduces the cost of the apparatus, but also increases the efficiency of the heat transfer; and also to improve the construction of heat exchange apparatus in the other respects hereinafter described and set forth in the claims.

In the accompanying drawings:

Fig. 1 is a fragmentary, sectional elevation of a tubular heat exchange apparatus illustrating one practical embodiment of the invention.

Fig. 2 is an enlarged, sectional view showing one of the internal tubes and the locking or locating device therefor.

Fig. 3 is a transverse section thereof, on line 3—3, Fig. 2.

Fig. 4 is an end elevation showing a locking ring of slightly modified construction, for the inner tube.

Fig. 5 is a section thereof on line 5—5, Fig. 4.

Fig. 6 is a sectional view of the wedging ring of the locking device.

Fig. 7 is a section illustrating a slightly modified construction.

The heat exchange apparatus illustrated in Fig. 1, with the exception of the locking or locating device for the internal tubes thereof, is of known construction, and it may be of the construction illustrated or other usual or suitable construction.

Said apparatus comprises a series of parallel outer tubes 10, of which two are shown, and a series of internal or inner tubes 11, each of which passes through one of the outer tubes, being separated therefrom by an annular space through which water or other medium can flow. The outer tubes are joined at their ends to headers or devices 12 and 13, having passages which connect the outer tubes, one to another, for the passage of the medium through the several outer tubes, which, as shown have their ends secured in packing boxes 14 of any usual or suitable construction in the headers. The inner tubes 11 pass through the headers 12 and 13 with their opposite ends projecting out of the headers through packing boxes in the outer walls of the headers, and the internal tubes are joined to each other end to end externally of the headers 12 and 13 by suitable return connectors 15 and 16 which may be of any usual or suitable construction. Each of the return connectors 15 and 16 shown, comprises a base 17 which is secured to the adjacent ends of two internal tubes 11, and a movable cap or cover 18 which, together with the base 17, forms the return passage connecting the ends of the two tubes. This cover 18 is mounted on an arm 19 hinged at one end to the base member 17 and releasably secured at its opposite end to the base by a screw clamp 20, whereby the cover 18 is adapted to be clamped tightly against the base 17 but can be released to permit the cover 18 to be opened to expose and afford access to the interiors of the tubes 11.

The packing box 21 through which one end of each internal tube 11 passes out of the adjacent header 13 may be of any usual or suitable construction, this packing box consisting of an ordinary gland, which is screwed into a threaded hole in the outer wall of the header 13 and is adapted to compress a packing 22 between its inner end and a shoulder at the inner end of the hole into which the gland is screwed.

The opposite end of each internal tube 11 passes through a packing box, which, as shown, is formed by a hole 23 in the outer wall of the opposite header 12, and a gland 24 screwed into the hole 23 and adapted to compress one or more packing rings 25 to pack the hole for preventing leakage through the same around the internal tube 11.

Surrounding the internal tube 11, preferably within the hole 23, is a locking or locating collet or device comprising a contractible ring 26 which closely encircles the tube 11, and a cooperating contracting or wedge member 27 which engages the ring 26, said members having complementary faces which are adapted by relative movement thereof longitudinally of the tube, to contract the ring 26 about and cause it to firmly grip the tube 11.

In the construction shown in Figs. 2 and 3, the contractible ring 26 is split, having a bevelled or tapered outer periphery and is arranged with its larger, outer end contacting with the adjacent packing ring 25 of the stuffing box, while the wedge member 27 is a solid ring which abuts at its larger, inner end, against a shoulder 28 at the inner end of the hole 23 in the header.

With the parts thus constructed and arranged, when the packing gland 24 is screwed into the threaded hole 23, it forces the contractible ring 26 inwardly wedging it into the tapered opening of the wedge 27, thereby compressing or contracting the inner ring 26 about the tube 11 so as to firmly grip the inner tube and stationarily hold it in place in the header 12. Instead of the separate wedge ring 27, the contractible ring 26, if desired, could be arranged to be contracted onto the tube by engagement with the integral shoulder 27a on the header or stationary part, as illustrated in Fig. 7.

The locking or locating device formed by the complementary ring 26 and wedge member 27 shown in Figs. 4–6 is similar to the construction shown in Figs. 2 and 3 and operates similarly to bind the inner tube in place, but in this modified construction the tapered, inner ring, instead of being split, is provided in its thinner edge with a suitable number of notches 29 which thus adapt the ring 26a to be contracted onto the tube 11 by the wedging action of the complementary member 27, so as to tightly grip and stationarily hold the tube in place.

The locking or locating device, in each of the constructions shown comprises a contractible ring which surrounds and closely fits, but is detached from the internal tube 11, and a complementary contracting member which, by relative movement of the contractible ring and the contracting member, contracts the former into firm, frictional holding engagement with the tube so as to hold the tube stationarily in place at the point at which the locking device is located while the tube is permitted to expand and contract freely through the stuffing box or gland at its opposite end.

I claim as my invention:

1. A heat exchange device comprising connected outer tubes, connected internal tubes extending lengthwise through said outer tubes, and a locking device for each of said internal tubes, comprising a contractible ring surrounding said tube but disconnected therefrom, and a wedging device adapted by relative longitudinal movement between the same and said contractible ring to contract the latter about and cause it to firmly grip and hold said internal tube.

2. A heat exchange device comprising an outer tube, an internal tube which extends lengthwise through said outer tube, and a locking device for said internal tube comprising a contractible ring which surrounds said internal tube within a relatively stationary part of said heat exchange device, and a complementary device adapted by relative longitudinal movement between the same and said contractible ring to contract the latter about and cause it to firmly grip and hold said internal tube.

3. A heat exchange device comprising an outer tube, an internal tube extending lengthwise through said outer tube, a packing box including an adjustable gland and packing for sealing the space between the internal and outer tubes, and a locking device for the internal tube comprising a contractible ring surrounding said tube within said packing box, and means actuated by the adjustment of said gland for contracting said contractible ring about and causing it to firmly grip and hold said internal tube.

4. A heat exchange device comprising an outer tube, an internal tube extending lengthwise through said outer tube, a packing box including an adjustable gland and packing for sealing the space between the internal and outer tubes, and a locking device for the internal tube comprising a contractible ring surrounding said tube within said packing box between said packing and the inner end of the packing box, and means actuated by the adjustment of said gland for contracting said contractible ring about and causing it to firmly grip and hold said internal tube.

5. A heat exchange device comprising an outer tube, an internal tube, extending lengthwise in the outer tube, and packing boxes through which the opposite ends of said internal tube extend, one of said packing boxes including an adjustable gland, and a locking device for the internal tube comprising a contractible ring surrounding said internal tube within said last mentioned packing box but disconnected from said tube, and means operated by the adjustment of said gland for contracting said contractible ring about and causing it to firmly grip and hold said internal tube.

6. A heat exchange device comprising an outer tube, an internal tube, extending lengthwise through said outer tube, a packing box through which one end of said internal tube extends and which includes an adjustable gland, and a locking device for said internal tube comprising inner and outer rings having complementary tapered contacting faces, said inner ring being contractible and said complementary rings being moved relatively to each other by the adjustment of said gland, whereby said contractible ring is contracted about and caused to firmly grip and hold said internal tube.

CHARLES B. DALZELL.